United States Patent Office 3,504,174
Patented Mar. 31, 1970

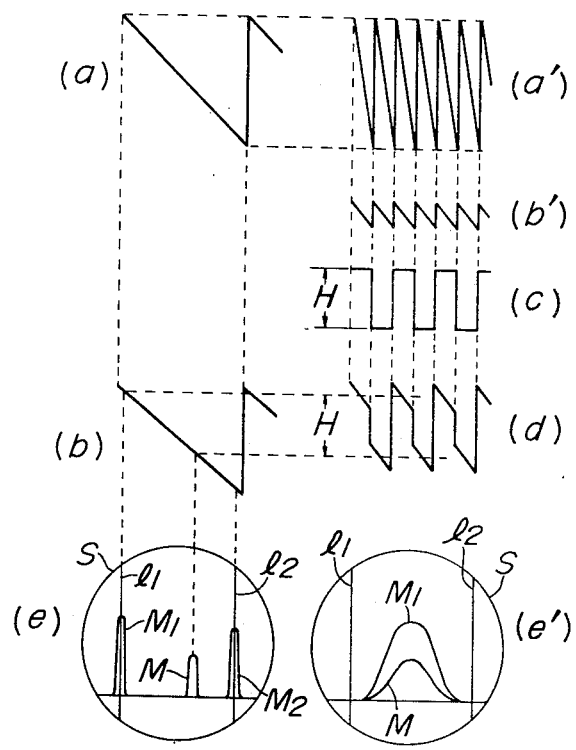

3,504,174
PRECISION MASS SPECTROMETER APPARATUS
Koji Nisiwaki, Yasuo Nakajima, and Yasuhide Hisamoto, Katsuta-shi, and Yukichi Ueno, Mito-shi, Japan, assignors to Hitachi, Ltd., Tokyo, Japan, a corporation of Japan
Filed Apr. 28, 1967, Ser. No. 634,655
Claims priority, application Japan, May 2, 1966, 41/27,566
Int. Cl. H01j *39/34*
U.S. Cl. 250—41.9              12 Claims

ABSTRACT OF THE DISCLOSURE

A precision mass spectrometer having means for ionizing sample molecules, dispersing the ions according to their mass after they are accelerated and for detecting the dispersed ions, and means for displaying peaks of the mass spectrum on a cathode-ray tube, bringing two known peaks spaced apart one or several mass units into coincidence with index lines on the cathode-ray tube, causing to luminesce an unknown sub-peak existing in the neighborhood of the known peaks, and then bringing the luminant sub-peak into coincidence with one of the two known peaks.

---

This invention relates to mass spectrometers, and more particularly to a precision mass spectrometer based on the so-called peak-matching method which comprises indicating a mass spectrum on a cathode-ray tube and adjusting an unknown peak to coincide with a known peak of the mass spectrum.

If it is possible to determine the mass of ions with an accuracy of ±1 milli-mass unit by mass spectroscopy, molecular formulas of organic compounds can be easily determined.

Mass spectrometers using the so-called recording method which comprises recording a mass spectrum on a recording medium and determining the mass of ion from the recorded mass spectrum is known. According to this method, however, the accuracy of the measurement is at most in the order of ±4 milli-mass units. Therefore, it is impossible to determine molecular formulas exactly.

Mass spectrometers using the so-called peak matching method which comprises indicating a mass spectrum on a cathode-ray tube and causing an unknown peak to coincide with the known peak thereof are also generally known. According to this method the mass of the ion can be measured with high accuracy and it is also possible to determine molecular formulae of samples. With precision mass spectrometers based on such peak matching method, however, when many peaks exist in the neighborhood of the unknown peak, there arises a difficulty that it is hardly possible to bring the unknown peak into coincidence with the known peak.

One object of the present invention is to provide a precision mass spectrometer in which an unknown peak can be easily, accurately and correctly brought into coincidence with a known peak.

Another object of the present invention is to provide a precision mass spectrometer in which a known peak and an unknown peak which are to be brought into coincidence can be magnified over a wide range of magnifications.

FIG. 3 is a schematic representation of electric signal waveforms and the manner of appearance of a mass spectrum on a cathode-ray tube screen, illustrating the basic principle according to the invention.

Figure 1:
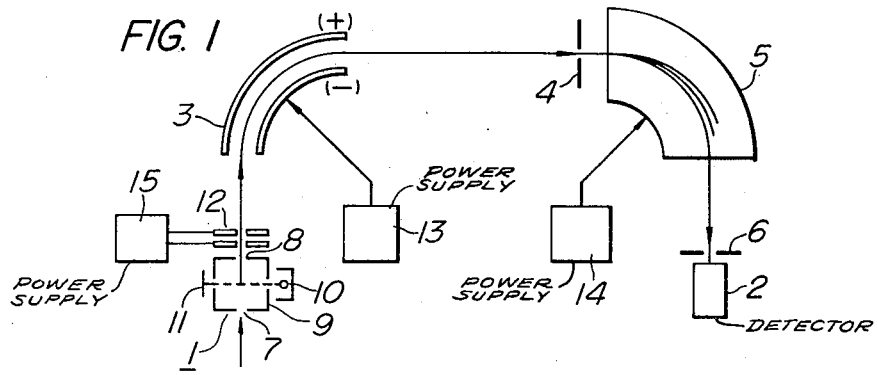
FIG. 1 is a block diagram of the analyzing section of a precision mass spectrometer embodying the present invention.

Referring to FIG. 1 showing diagrammatically the analyzing section of the precision mass spectrometer, the analyzing section includes an ion source 1 and a detector 2. Between these two elements, there are an electrostatic deflector 3, a first-stage slit 4, an electromagnetic deflector 5, and a last-stage slit 6 which are arranged in the above order. The ion source 1 comprises an ionization chamber 9 having a sample inlet 7 and an ion outlet 8, an electron source 10 for ionizing the sample molecules introduced into the ionization chamber 9 through the sample inlet 7 by the electron bombardment, an electron collecting electrode 11, and an accelerating electrode system 12 for the acceleration of the ions emitted from the ion outlet 8. The electrostatic deflector 3, the electro-magnetic deflector 5 and the accelerating electrode system 12 are connected to a power supply 13 for establishing an electrostatic field, a power supply 14 for establishing a magnetic field and a power supply 15 for ion accelerating voltage supply, respectively. The power supply 14 for establishing the magnetic field has a variable output.

When a sample molecule is introduced into the ionization chamber 9 through the sample inlet 7, the sample molecule is bombarded to be ionized by electrons emitted from the electron source 10. Electrons emitted from the electron source 10 are, of course, collected by the electron collecting electrode 11. When an accelerating voltage is applied to the accelerating electrode system 12 from the power supply 15, ions which are ionized in the ionization chamber 9 are drawn out of the chamber 9, accelerated and fed into the electrostatic deflector 3 by the accelerating voltage. When a predetermined voltage for establishing an electrostatic field is applied to the electrostatic deflector 3 from the power supply 13, the electrostatic field established by the electrostatic deflector 3 disperses the ions supplied to the deflector 3 according to their velocity. So, the ions of a predetermined velocity solely pass through the first-stage slit 4 and are admitted into the magnetic deflector 5. When electric current for establishing a magnetic field is supplied to the magnetic deflector 5 from the power supply 14, the magnetic field established by the magnetic deflector 5 disperses the ions admitted through the first-stage slit 4 into the magnetic deflector 5 according to their mass. Therefore, the ions of a predetermined mass solely pass through the last-stage slit 6 and are detected by the detector 2. As is well known, the sample molecules may be a mixture of at least a known substance and an unknown substance.

Figure 2:
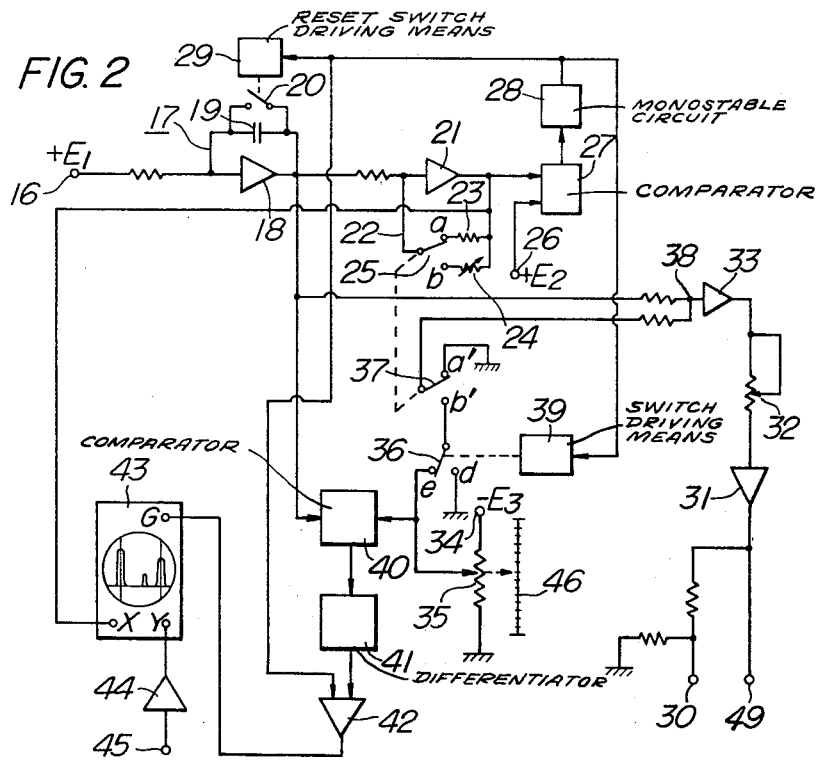
FIG. 2 is a block diagram of the electric control system of the precision mass spectrometer according to the present invention.

Referring to FIG. 2 diagrammatically showing the electric control system of the precision mass spectrometer, a terminal 16, to which a DC voltage ($+E_1$) is applied, is connected with an integrator 17. The integrator 17 comprises an amplifier 18 and a capacitor 19 which is connected in parallel to the amplifier 18, and a reset switch 20 is connected across both terminals of the capacitor 19. An amplifier 21 is connected to the output side of the integrator 17. A feed-back line 22 for the amplifier 21 includes a resistance 23 and a variable resistance 24 which are connected in parallel for switchover by means of a change-over switch 25. A DC voltage ($+E_2$) applied to a terminal 26 is fed into a comparator 27 together with an output signal of the amplifier 21. A monostable circuit 28 is connected to the output side of the comparator 27 and a reset switch driving means 29 is connected to the output side of the monostable circuit 28 to drive the reset switch 20.

Now, when the DC voltage ($+E_1$) is applied to the integrator 17, the voltage is integrated therein and the output signal from the integrator 17 is amplified by the amplifier 21 and then admitted into the comparator 27. When the DC voltage ($+E_2$) is applied from the terminal 26 to the comparator 27, the comparator 27 generates pulses when the signal introduced from the amplifier 21 is in coincidence with the DC voltage signal ($+E_2$), and thereby the monostable circuit 28 generates a square wave signal. This square wave signal actuates the reset switch driving means 29. The reset switch 20 is closed by being actuated by the reset switch driving means 29 and the output signal of the integrator 17 is thereby reset. Thus, at the output side of the integrator 17 and the output side of the amplifier 21, saw-tooth waveform signals appear. These two signals have the same frequency, but the amplitude of the output signal of the integrator 17 is variable by varying the amount of feed-back from the amplifier 21. Suppose now that the resistance values of the resistance 23 and variable resistance 24 differ from each other, then the signal appearing at the output side of the amplifier 21 when the change-over switch 25 is in its $a$ position, has the same amplitude but a different frequency from that of the signal appearing in the $b$ position of the switch 25. In this case, the two signals appearing at the output side of the integrator 17 have, of course, different amplitudes and different frequencies. Suppose now that a signal waveform as shown in FIG. 3$a$ appears at the output of the amplifier 21 when the change-over switch 25 is in its $a$ position and a signal waveform as shown in FIG. 3$a$ appears at such output when the switch 25 is in its $b$ position, then, signal waveforms as shown in FIGS. 3$b$ and 3$b'$ appear at the output side of the integrator 17, respectively. It will be seen that the signals shown in FIGS. 3$a$ and 3$a'$ have the same amplitude, but the signal shown in FIG. 3$a'$ has a higher frequency than that of the signal shown in FIG. 3$a$ and the signal shown in FIG. 3$b'$ as the same frequency as that of the signal shown in FIG. 3$a'$. In the following description, the signal shown in FIG. 3$b$ will be called a first saw-tooth wave signal and the signal shown in FIG. 3$b'$, a second saw-tooth wave signal.

The terminals 49 and 30 are connected to the respective power supplies 15 and 13, and they are connected to the output side of the integrator 17 through an amplifier 31, a variable resistance 32 and an amplifier 33. 34 is a terminal to which a reference DC voltage ($-E_3$) is applied, and 35 is a variable resistance. A switch 36 is provided to modulate the DC voltage supplied from the terminal 34 through the variable resistance 35 into a square wave signal. A change-over switch 37 is connected between the change-over switch 36 and an input terminal 38 of the amplifier 33, and is operative in interlocked relation with the change-over switch 25. That is, the change-over switch 37 is urged to its $a'$ position when the change-over switch 25 is changed over to its $a$ position, and is urged to its $b'$ position when the switch 25 is changed over to its $b$ position.

A switch driving means 39 to drive the switch 36 is provided and has a bistable circuit therein. The switch driving means 39 is constructed in a manner that the output of the monostable circuit 28 is admitted thereinto. A comparator 40 compares the output signal of the integrator 17 with the DC voltage signal supplied from the terminal 34 through the variable resistance 35. A differentiator 41 differentiates the output signal of the comparator 40, and an amplifier 42 amplifies the square wave signal derived from the differentiator 41 and is arranged to also receive, the output signal (square wave signal) of the monostable circuit 28. A cathode-ray tube 43 has its X-axis deflecting coil X connected to the output side of the amplifier 21 and its Y-axis deflecting coil Y connected to the detector 2 through an amplifier 44 and a terminal 45, while its grid G is connected to amplifier 42. A scale 46 is provided to read the setting of the variable resistance 35.

When the change-over switch 25 is urged to its $a$ position and the change-over switch 37 is urged to its $a'$ position, the first saw-tooth wave signal such as is shown in FIG. 3$b$, which is the output signal of the integrator 17, is admitted through the amplifier 33, the variable resistance 32 and the amplifier 31, and then led through the terminals 49 and 30 to the respective power supplies 15 and 13. Therefore, scanning of mass is performed by the voltage waveform as shown in FIG. 3$b$. In the meantime, the signal waveform as shown in FIG. 3$a$ (hereinafter to be called a first X-axis scanning signal) which is the output signal of the amplifier 21, is applied to the X-axis deflecting coil X of the cathode-ray tube 43 and at the same time a mass spectrum signal from the detector 2 is applied through the terminal 45 and the amplifier 44 to the Y-axis deflecting coil Y of the cathode-ray tube 43. Therefore the peaks of the mass spectrum appear on the screen S of the cathode-ray tube 43 as shown in FIG. 3$e$.

Now, when the strength of the magnetic field produced by the magnetic deflector 5 is changed by adjusting the power supply 14, the level of mass scanning changes, and an unknown sub-peak M to be detected and two known peaks $M_1$ and $M_2$ can be displayed on the screen S of the cathode-ray tube 43. Therefore, one known peak $M_1$ of the two known peaks $M_1$ and $M_2$ can be brought into coincidence with an index line $l_1$. When the variable resistance 32 is suitably adjusted, the amplitude of the first saw-tooth wave signal (FIG. 3$b$) changes, and therefore the other known peak $M_2$ can be brought into coincidence with another index line $l_2$. FIG. 3$e$ shows a state in which one known peak $M_1$ coincides with the index line $l_1$ and the other known peak $M_2$ coincides with the index line $l_2$.

On the other hand, the DC reference voltage is applied from the terminal 34 and then through the variable resistance 35 to the comparator 40, compared in the comparator 40 with the first saw-tooth wave signal (FIG. 3$b$), which is the output of the integrator 17, converted into a square wave signal by the differentiation in the differentiator 41, and then applied to the grid G of the cathode-ray tube 43 through the amplifier 42. Thus, the cathode-ray tube 43 is subjected to brightness modulation by the square wave signal derived from the differentiator 41. Therefore, by adjusting the variable resistance 35, a bright spot appears on the screen S and the bright spot can be moved as desired. It is thus possible to bring the bright spot into coincidence with the unknown sub-peak M. The reference DC voltage ($-E_3$) is so selected that the bright spot can coincide with the index line $l_2$ when the variable resistance 35 is adjusted to its full scale position.

After the above manipulations, the change-over switch 25 is changed over to its $b$ position, and the change-over switch 37 is changed over to its $b'$ position. Then the signal as shown in FIG. 3$a'$ (hereinafter to be called a second X-axis scanning signal) which is the output of the amplifier 21, is applied to the X-axis deflecting coil of the cathode-ray tube 43, while at the same time, the second saw-tooth wave signal such as is shown in FIG. 3$b'$ appears at the output of the integrator 17.

In the meantime, the switch driving means 39 which has a bistable circuit therein is triggered by the output signal of the monostable circuit 28, and the switch 36 is changed over alternately between its positions $d$ and $e$ each time the output signal is applied to the drive means 39. Accordingly, the output signal of the variable resistance 35 is converted into a square wave signal such as is shown in FIG. 3$c$ whose period is twice as long as that of the second saw-tooth wave signal such as is shown in FIG. 3$b'$ and this square wave signal is added to the second saw-tooth wave signal, through the switch 37, at the input terminal 38 of the amplifier 33. Therefore, a signal of waveform as shown in FIG. 3$d$ is applied to the power supplies 15 and 13. That is, when the change-over switches 25 and 37 are in their positions $b$ and $b'$ respectively, the mass scanning is effected by the signal waveform shown in FIG. 3d.

Adjusting the bright spot to coincide with the unknown peak M by manipulation of the variable resistance 35 when the mass scanning is conducted with the first saw-tooth wave signal (FIG. 3b) means that the output signal of the variable resistance 35 is set at a voltage H (FIGS. 3c and 3d) corresponding to the distance between the known peak $M_1$ and the unknown peak M. Therefore, when the change-over switches 25 and 37 are changed over to the respective positions $b$ and $b'$, the known peak $M_1$ and the unknown peak M are automatically brought into coincidence with each other on the screen S as shown in FIG. 3e'.

However, even if the bright spot is seemed to be brought into exact coincidence with the unknown peak M when the change-over switches 25 and 37 are urged to their $a$ and $a'$ positions, the peak $M_1$ and the peak M may not necessarily coincide exactly when the change-over switches 25 and 37 are changed over to their $b$ and $b'$ positions. This is because the peaks $M_1$ and M are displayed in a more magnified state on the screen S when the change-over switches 25 and 37 are changed over to the $b$ and $b'$ positions than when they are changed over to their $a$ and $a'$ positions. In this case, the peaks $M_1$ and M can of course be brought into exact coincidence by fine adjustment of the variable resistance 35 under the state in which the change-over switches 25 and 37 are changed over to their $b$ and $b'$ positions. In whichever case, the mass difference of the unknown peak M from the known peak $M_1$ can be read directly on the scale 46. It has been experimentally confirmed that the mass of the unknown peak M can be directly read with a precision of ±1 milli-mass unit when the amplitude of the second saw-tooth wave signal is set ten times that of the first saw-tooth wave signal (that is, a magnifying power of 10), the peaks $M_1$ and $M_2$ are spaced apart 1 mass unit, and the scale 46 is equally graduated to one-thousandth of 1 mass unit.

In the embodiment described above, M is shown as a single sub-peak. In practice, however, many sub-peaks may appear in close proximity to each other. In such a case, it is easily conceivable that the unknown peak could hardly be exactly and correctly brought into coincidence with the known peak without the provision of means to bring the bright spot into coincidence with the unknown peak such as the one disclosed by the present invention. In the present invention, however, such problems can reasonably be solved by the provision of the unique means by which the bright spot can be brought into coincidence with the sub-peak as mentioned hereinbefore. Further, the provision of means to vary the amplitude of the second saw-tooth wave, that is, the means to vary the magnifying power ensures measuring of the mass of the unknown peak with a higher precision than heretofore.

Application of the output of the monostable circuit 28 through the amplifier 42 to the grid G of the cathode-ray tube 43 is effective to blank out the fly-back lines in the cathode-ray tube 43.

What is claimed is:

1. In a precision mass spectrometer apparatus having an ion source, ion control means including means for accelerating ions of a sample produced in the ion source and means to disperse the ions accelerated by the accelerating means according to their mass difference, and means for detecting the ions dispersed by said dispersing means; the improvement comprising generating means for selectively producing a first scanning signal and a second scanning signal having smaller amplitude than the first scanning signal;

an adjustable DC reference signal source;

switching means actuatable for converting said reference signal into an intermittent signal;

connecting means for connecting said ion control means to said generating means and said switching means including means for actuating said switching means only when said generating means produces said second scanning signal so as to provide a mass scanning signal formed of said first scanning signal alone or a second signal formed by the sum of said intermittent signal and said second scanning signal;

displaying means including a cathode-ray tube responsive to the outputs of said generating means and the detecting means for displaying thereon at least a part of the mass spectrum detected by said detecting means as a result of the mass scanning.

2. A precision mass spectrometer apparatus according to claim 1, in which said connecting means includes, means for adjusting the amplitude of said first scanning signal.

3. A precision mass spectrometer apparatus according to claim 1, further comprising means for comparing said adjustable DC reference signal with a particular value of said first scanning signal so as to supply a brightness signal to said displaying means.

4. A precision mass spectrometer apparatus according to claim 3, in which said connecting means includes means for adjusting the level of the mass scanning signal and means for adjusting the amplitude of said first scanning signal.

5. A precision mass spectrometer apparatus according to claim 4, in which said first and second scanning signals are saw-tooth waves and said intermittent signal is a square wave having the same amplitude as said adjustable DC reference signal and a period twice as long as that of said second scanning signal.

6. A precision mass spectrometer apparatus according to claim 5, in which said connecting means further includes means for adding said intermittent signal to said second scanning signal and said adjustable DC reference signal source is provided with an adjusting means including a dial having a vernier.

7. A precision mass spectrometer apparatus according to claim 6, in which said generating means comprises an integrating circuit provided with a constant voltage, an amplifying circuit having gain adjusting means for amplifying the output of the integrating circuit, a comparator connected to the amplifying circuit for producing a pulse at the instant the amplified output reaches a reference voltage, and means responsive to said pulse from the comparator for resetting the integrating circuit, and the output of the integrating circuit being supplied to at least one of the accelerating means and the dispersing means.

8. A precision mass spectrometer apparatus comprising an analyzing section having an ion source, means for admitting sample molecules into said ion source, means disposed in said ion source to ionize the sample molecules, means disposed in said ion source to accelerate the ions produced in said ion source, means to disperse the ions accelerated by said accelerating means according to their mass difference, and a detector to detect the ions dispersed by said dispersing means;

means to generate a first saw-tooth wave signal and a second saw-tooth wave signal having a smaller amplitude than the former;

means to generate a DC reference signal;

means to convert said DC reference signal into a square wave signal whose period is twice as long as that of said second saw-tooth wave signal;

means to obtain an added signal of said second saw-tooth wave signal and said square wave signal;

means to effect selective mass scanning by said first saw-tooth wave signal and said added signal;

means for adjusting the level of the mass scanning;

means to compare said DC reference signal with said first saw-tooth wave signal and to obtain a brightness modulating signal by differentiating the compared signal;

means to adjust the amplitude of said first saw-tooth wave signal;

means to adjust said DC reference signal;

means to obtain a first X-axis scanning signal of the same frequency as that of said first saw-tooth wave signal and a second X-axis scanning signal of the same frequency as that of said second saw-tooth wave signal and of the same amplitude as that of said first X-axis scanning signal;

means to read the setting of said DC reference signal; and a cathode-ray tube to display the mass spectrum thereon, said tube having its X-axis deflecting coil so connected that said first X-axis scanning signal is applied thereto when mass scanning is effected by said first saw-tooth wave signal and that said second X-axis canning signal is applied thereto when mass scanning is effected said added signal, and said tube having its Y-axis deflecting coil so connected to said detector that brightness modulation is done by said brightness modulating signal when said mass scanning is effected by said first saw-tooth wave signal.

9. The precision mass spectrometer apparatus according to claim 8, further comprising means to vary the amplitude of said second saw-tooth wave signal.

10. In a process of mass spectrometery for analyzing a sample by means of mass scanning in an analyzing unit and displaying the mass spectrum of the sample on a cathode-ray tube device, the improvement comprising supplying a first saw-tooth wave signal to the analyzing unit as a first scanning signal and the corresponding signal to the cathode-ray tube as a sweeping signal; adjusting the amplitude of the first scanning signal so as to display on the cathode-ray tube an unknown peak in the mass spectrum to be measured and at least two known peaks in the mass spectrum; supplying to the analyzing unit a second scanning signal composed of a second saw-tooth wave signal of a smaller amplitude than the first saw-tooth wave signal and a square wave signal whose amplitude is precisely adjustable, and at the same time supplying to the cathode-ray tube a sweeping signal corresponding to the second saw-tooth wave signal; adjusting the amplitude of the square wave signal so that the unknown peak to be measured may come to the same position as one of the known peaks; whereby amount of the amplitude of the square wave signal corresponds to the mass difference between the peak to be measured and the one of the known peaks.

11. A process of mass spectrometery according to claim 10, wherein the sample comprises a known substance and at least one unknown substance and the amount of the amplitude of the square wave signal is adjusted so that the unknown peak to be measured may come to the same position as the one of the known peaks of the known substance.

12. A process of mass spectrometery according to claim 10, further comprising predetermining the amplitude of the square wave signal so as to have substantially the same value as the corresponding value of the first scanning signal to the unknown peak by means of providing brightness modulating signals to the cathode-ray tube before the second scanning signal is supplied.

References Cited

UNITED STATES PATENTS 2,380,439    7/1945    Hoskins et al.
3,235,725    2/1966    Kendall.

ARCHIE R. BORCHELT, Primary Examiner

S. C. SHEAR, Assistant Examiner